Oct. 30, 1956

M. H. HAYES 2,769,102

ANTI-LOADING CIRCUITS

Filed Dec. 11, 1953

MONSON H. HAYES
INVENTOR

BY
Watson Johnson Leavenworth & Blair
ATTORNEYS

United States Patent Office 2,769,102

Patented Oct. 30, 1956

2,769,102

ANTI-LOADING CIRCUITS

Monson H. Hayes, Binghamton, N. Y., assignor to Link Aviation, Inc., Binghamton, N. Y., a corporation of New York Application December 11, 1953, Serial No. 397,516

10 Claims. (Cl. 307—149)

My invention relates to a method and apparatus for connecting a load impedance to a voltage source and particularly to methods and apparatus for connecting a load impedance to voltages developed across variable impedances such as potentiometers, for example.

In the electrical arts generally, and especially in the analogue computer, automatic control, and instrumentation arts, potentiometers and other variable impedances are widely employed to divide a voltage, vary a voltage as a function of a mechanical shaft input, to select a desired portion of a given voltage, etc. In the majority of these applications it is highly desirable to avoid drawing appreciable current from the voltage source.

If a load of low impedance is connected to the output terminals of the voltage source, various undesirable effects occur. If the voltage source impedance has a reactive component, a phase shift will occur because of the current flowing through the source impedance. If the voltage of the voltage source is developed across a potentiometer, for example, heating of a portion of the potentiometer because of loading currents will change the resistance of that portion, causing a supposedly linear potentiometer to operate non-linearly, or causing a non-linear potentiometer to produce an undesired function of shaft rotation.

Another undesirable effect of loading a voltage source which includes a variable impedance, is that voltage drop caused by loading current through a portion of the variable impedance winding causes an error in the output voltage selected by the wiper arm of the variable impedance. It is desirable in almost every potentiometer or other variable impedance application that the voltage output from the potentiometer or other variable impedance be a direct function of shaft rotation. If appreciable current is drawn through a portion of the potentiometer or impedance winding to supply a load impedance, the output voltage across the load impedance will not be proportional to the rotation of the wiper arm of the potentiometer or other variable impedance, but will be in error. This may be expressed as:

$$\%e=\frac{\rho(X^2-X^3)}{1+\rho(X-X^2)}$$

where $\rho$ is the ratio of potentiometer or other variable impedance to the load impedance, X is the normalized rotation of the potentiometer or other variable impedance, the maximum value of X being unity and its minimum value being 0. My invention serves to eliminate the above enumerated undesirable effects of loading, as well as numerous others.

It is a primary object of my invention to provide a method and apparatus by which a load may be coupled to a voltage source without drawing substantial current from said source.

It is an additional object of my invention to provide a method and apparatus by which a load may be directly coupled to the output terminals of a voltage source without drawing substantial current from said source and without lowering the voltage appearing across said output terminals.

It is a further object of my invention to reduce or completely eliminate loading errors by eliminating or minimizing the effect of a load upon the function of a potentiometer, or other variable impedance.

It is a further object of my invention to provide means by which a voltage may be varied exactly as a function of the rotation of a mechanical shaft.

Other objects will appear as the description proceeds.

Figure 1:
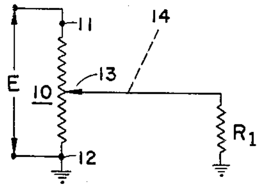
Fig. 1 is a schematic diagram showing the conventional prior art means employed to provide a voltage as a function of shaft rotation.

Referring to Fig. 1, there is shown a variable impedance 10, which may be a potentiometer or other variable impedance, although I have shown schematically a potentiometer. The variable impedance 10 has fixed terminals 11 and 12, between which a resistance or other impedance is connected. Wiper arm 13 engages the resistance or impedance connected between terminals 11 and 12. Shaft 14 is mechanically connected to wiper arm 13, and rotation of shaft 14 causes wiper arm 13 to traverse the resistance or other impedance connected between terminals 11 and 12. Because such potentiometers are extremely well known to those skilled in the electrical art and electronic art, further description of the structure and operation of this prior art device is deemed unnecessary.

Connected to terminals 11 and 12 is a voltage E, a portion of which it is desired to derive as a function of the rotation of shaft 14. The conventional method heretofore utilized in deriving a voltage as a function of shaft rotation has been to use the voltage appearing between wiper arm 13 and one of the fixed terminals of the potentiometer. Since one terminal of the load impedance is connected to ground, the voltage across the load impedance will be the voltage appearing between wiper arm 13 and fixed terminal 12, which is shown also as being connected to ground. Throughout the specification all voltages mentioned are taken with respect to ground, unless otherwise noted.

If no load impedance were connected to wiper arm 13, no current would flow through wiper arm 13, and the current flowing in potentiometer 10 will all flow directly between terminals 11 and 12. If, however, use is to be made of the voltage appearing at wiper arm 13, a load must usually be connected to wiper arm 13. If a load $R_1$ is connected to wiper arm 13, a current will flow through the load impedance $R_1$. This current also flows through the portion of the potentiometer impedance between wiper arm 13 and terminal 11, but not through the portion of potentiometer 10 between wiper arm 13 and terminal 12. It will therefore be seen that unequal currents flow in the upper and lower portions of the potentiometer impedance. These unequal currents cause unequal heating of the respective portions of the potentiometer winding, causing unequal changes in resistance of the two portions. Assuming that the potentiometer is supposedly a linear potentiometer, the unequal currents through the two portions of the potentiometer impedance cause a non-uniform potential gradient across the potentiometer impedance. It will be apparent that a non-uniform potential gradient across the potentiometer impedance will cause a non-linear change of voltage on wiper arm 13, as a function of rotation of shaft 14 which moves wiper arm 13 between terminals 11 and 12.

Figure 2:
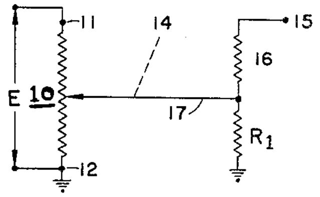
Fig. 2 is a schematic diagram of a portion of my invention, useful in understanding the operation of my invention.

Referring to Fig. 2 there is shown a portion of my invention. In Fig. 2 like numerals correspond to like parts of Fig. 1. It will be seen that the only added part in Fig. 2 is an impedance 16, shown as comprising a resistor. It will be recalled that the adverse effects described above were caused by the flow of current through the load impedance $R_1$. In my invention such current is still allowed to flow through load impedance $R_1$, but an additional current of opposite sense is combined with the aforesaid load current to cancel current flow in or out of the voltage source.

Assume, for purposes of explanation, that the potentiometer 10 has a resistance of 1000 ohms, that the load impedance has a resistance of 10,000 ohms, and that the voltage E applied to terminals 11 and 12 is equal to 100 volts. Assume also that shaft 14 has been rotated 40% of its travel away from terminal 11 and has thusly moved wiper arm 13 40% of the distance between terminals 11 and 12. If potentiometer 10 were linear, the voltage across the load impedance should then be 60 volts. But because of the current flowing in the load impedance, the actual voltage across the load impedance will be approximately 58.636 volts. A current of almost 6 milliamperes will be flowing through the load impedance. If the load impedance is less, even greater current will flow through the load impedance $R_1$, and a greater error will occur.

Assume now that a current of about 6 milliamperes is caused to flow through resistor 16. If this current is made equal to the previously described current flowing in the load impedance $R_1$, resistor 16 may furnish all the current flowing through the load impedance $R_1$, no load will be placed on the potentiometer by the load impedance $R_1$, and no current will flow through the conductor 17 which connects wiper arm 13 to the load impedance. The voltage across the load impedance would then be exactly 60 volts, and would therefore be an accurate measure of the rotation of shaft 14. In order to cause the correct amount of current to flow through resistor 16, a potential must be applied to terminal 15 which is equal to the correct potential desired on wiper arm 13 multiplied by the ratio of the sum of the impedances of resistor 16 and the load impedance to the impedance of the load impedance $R_1$. Thus, in the above example, if resistor 16 equals the load impedance $R_1$, a voltage of 120 volts must be applied to terminal 15. If the impedance of resistor 16 is twice the impedance of the load impedance $R_1$, 180 volts must be supplied to terminal 15. The potential applied to terminal 15 should be of the same polarity or phase as the voltage appearing on wiper arm 13.

Figure 3:
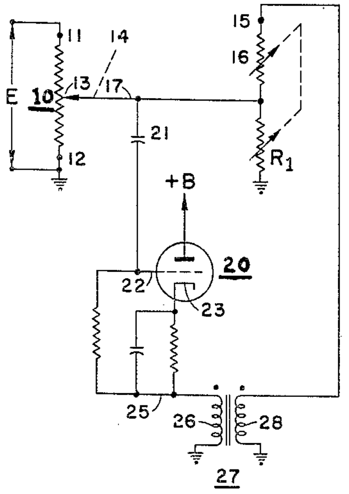
Fig. 3 illustrates schematically an embodiment of my invention as utilized in alternating current apparatus.

Referring to Fig. 3, an alternating voltage embodiment of my invention is shown. Like numerals refer to like parts already described in connection with Figs. 1 and 2. Wiper arm 13 of potentiometer 10 measures a portion of the voltage E applied to terminals 11 and 12, and connects this voltage to the load impedance $R_1$ through conductor 17, and to an isolating device 20 through capacitor 21. While I have shown a typical cathode follower as an isolating device, it will be apparent that other isolating devices may be employed. The input signal applied to the cathode follower grid 22 causes cathode 23 to follow the input signal in phase and magnitude. Because of the very high input impedance of the cathode follower, negligible current is drawn to drive the cathode follower. A substantial replica of the voltage applied to the cathode follower grid appears at the cathode follower output terminal 25.

The voltage appearing at output terminal 25 of the cathode follower cannot theoretically equal input voltage applied to grid 22, but if the gain of the cathode follower stage is high, the voltage at output terminal 25 will approximately equal the voltage appearing on wiper arm 13. The output voltage of the cathode follower is applied to the primary winding 26 of transformer 27. The voltage induced in secondary winding 28 of transformer 27 is applied to resistor 16. If the impedance of resistor 16 equals the load impedance, transformer 27 should have approximately a 1:2 turns ratio, so that the voltage applied to terminal 15 will be about twice the desired voltage appearing on wiper arm 13.

If the gain of the cathode follower stage, or other isolating stage is less than unity, a turns ratio of transformer 27 greater than 1:2 may be selected so that the voltage applied at terminal 15 will then be the correct value to cause a current in resistor 16 equal to the current in the load impedance. If the load impedance $R_1$ is made variable, as indicated symbolically in Fig. 3, resistor 16 should be varied proportionately, as indicated by the ganging symbol, so that the same current will always flow through the two impedances. With equal currents flowing in resistor 16 and load impedance $R_1$, no current will be drawn from potentiometer 10 to supply the load impedance $R_1$, and hence the only current drawn through wiper arm 13 and conductor 17 will be the negligible current required to drive grid 22 of the isolating device 20. With negligible current flowing through wiper arm 13, equal currents will flow in all portions of impedance 10 between potentiometer terminals 11 and 12, and hence the voltage appearing at wiper arm 13 and across load impedance $R_1$ will be a true function of rotation of shaft 14.

Figure 4:
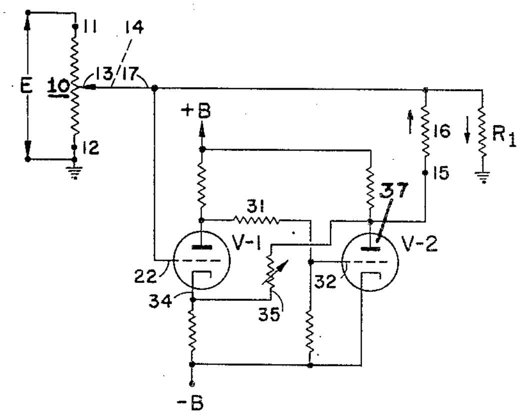
Fig. 4 illustrates schematically an embodiment of my invention as employed in direct current apparatus.

Fig. 4 shows a direct current embodiment of my invention. Like numerals refer to like parts shown in Figs. 1–3. Wiper arm 13 of potentiometer 10 measures a portion of the voltage E applied to terminals 11 and 12, and connects this selected voltage to load impedance $R_1$, through conductor 17, into an isolating device comprising vacuum tubes V–1 and V–2. The input voltage applied to grid 22 of triode V–1 varies the plate current of V–1, thusly varying the plate voltage of V–1. The voltage on the plate of V–1 is directly coupled through resistor 31 to grid 32 of triode V–2. Variation of grid potential of triode V–2 causes an inverse but amplified variation of plate voltage of V–2. Plate voltage of V–2 is fed back to cathode 34 of triode V–1 through adjustable gain rheostat 35. Since tubes V–1 and V–2 comprise a conventional direct current isolating and amplifying feedback circuit, further explanation of their operation is believed unnecessary. By proper adjustment of feedback rheostat 35, an output voltage will appear at plate 37 of triode V–2 which is equal to twice the voltage impressed on grid 22 of triode V–1. The same current then flows through resistor 16 and load impedance $R_1$, and the only current drawn from wiper arm 13 is the negligible current required to drive grid 22 of triode V–1.

While I have shown potentiometers in illustrating my invention, it will be apparent that my invention relates as well to other variable impedances, and furthermore to tapped fixed impedances. While I have shown vacuum tube and transformer amplifiers, it will be understood that other well known amplifying devices may be used in their stead. It will be apparent that a two-stage feedback amplifier having a gain of two may be substituted for the cathode follower and transformer utilized in Fig. 3.

It is important to note that the current through resistor 16 need not exactly equal or cancel the current through the load impedance $R_1$. Hence if the impedance of resistor 16 equals the impedance of load $R_1$, the voltage applied to terminal 15 need not be exactly twice the desired wiper arm voltage. As long as a voltage greater than the wiper arm voltage but less than three times the wiper arm voltage is applied to terminal 15 some improvement will obtain. If a voltage between 1.9 and 2.1 times the wiper arm voltage is applied to terminal 15, a reduction in potentiometer loading by a factor of 10 or greater will result. Hence the voltage gain of the amplifying means chosen need not be exactly two. It is also important to note that in alternating current embodiments of my invention, the voltage applied to terminal 15 need not be exactly in phase with the wiper arm voltage. If some phase shift occurs in the isolating and amplifying portions of my invention, it is necessary only to increase the amplification so that the component of the voltage at terminal 15 which is in phase with the wiper arm voltage is sufficient to cause a current through resistor 16 equal to the current in the load impedance $R_1$. It is essential, however, that the out-of-phase component of voltage at terminal 15 is not equal the in-phase component, or no improvement in loading will be effected.

My invention has a marked advantage over systems employing buffer amplifiers to reduce loading of a variable impedance, since buffer amplifiers must be extremely accurate and introduce little or no distortion, or else the voltage across the load impedance will not equal the wiper arm voltage. In the use of my invention, great accuracy of amplifying means is not necessary, as explained above, and any distortion introduced by the amplifying means of my invention will appear across the load impedance substantially reduced. For example, if the impedance of resistor 16 equals the load impedance $R_1$, distortion introduced by the amplifying means utilized will appear across the load impedance $R_1$ reduced by the ratio of the source impedance of potentiometer 10 to the impedance of resistor 16. In the worst condition, when wiper arm 13 is midway between terminals 11 and 12, the source impedance will equal the impedance of the winding between terminals 11 and 12 divided by four. It will be apparent that while I have explained my invention by reference to linear potentiometers and other linear variable impedances, my invention applies equally as well to variable impedances of a non-linear type.

Referring again to Fig. 3, it is important to note that in regard to alternating current embodiments of my invention, it is not necessary that the load impedance $R_1$ be a resistive load. It is only necessary that the impedance represented by resistor 16 in Fig. 3 be of the same type as the load impedance $R_1$. Hence, if load impedance $R_1$ were inductive or capacitive, the impedance represented by resistor 16 should be similarly inductive or capacitive.

It will thus be seen that the objects set forth above, among those made apparent from the preceding description, are efficiently attained. Since certain changes may be made in carrying out the above method and in the constructions set forth without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. An electrical distribution system having a voltage source and a load impedance connected in parallel circuit relationship, voltage modifying means responsive to the voltage across said voltage source, impedance means connected to said voltage modifying means and to said load impedance, the voltage modifying means and impedance means being so adjusted that substantially equal currents flow through said impedance means and said load impedance.

2. An electrical distribution system having a source of voltage and a load impedance connected in parallel circuit relationship, amplifying means having input and output terminal pairs, said input terminal pair connected to said voltage source, impedance means connected to said amplifying means, said impedance means and said load impedance being connected in series across the output terminals of said amplifying means.

3. An electrical distribution system as defined by claim 2 in which the voltage gain of said amplifying means substantially equals the ratio of the sum of the impedances of said impedance means and said load impedance to the impedance of said load impedance.

4. An electrical distribution system comprising a source of voltage and a load impedance connected in parallel circuit relationship, amplifying means responsive to the voltage across said voltage source, impedance means connected in series with said load impedance to receive the voltage output of said amplifying means, the voltage gain of said amplifying means being so chosen that the component of currents in said impedance means which are in phase with the currents in said load impedance are substantially equal in magnitude to said currents in said load impedance.

5. A method of reducing loading of a voltage source caused by connection of an impedance across said source comprising the steps of deriving a voltage equal to the open-circuit voltage of said voltage source, amplifying said voltage, applying said voltage to an impedance to provide a current, and supplying said current to said load impedance so as to cancel currents flowing directly to said load impedance from said voltage source.

6. Apparatus for deriving a voltage as a function of rotation of a mechanical shaft comprising a first impedance having first and second end terminals and a variable intermediate terminal, a source of voltage connected across said end terminals, amplifying means and a load impedance each connected between said intermediate terminal and one end terminal, a second impedance connected to said amplifying means, said second impedance and said load impedance being connected in series across the output circuit of said amplifying means, said variable intermediate terminal being operable by means of a shaft to transverse said first impedance.

7. Apparatus for producing a voltage as a function of movement of a mechanical member comprising a potentiometer having a source of voltage connected to its end terminals, isolating and amplifying means having input and output circuits, said input circuit and a load impedance connected in parallel between the variable terminal and one end terminal of said potentiometer, and impedance means connected in series with said load impedance across the output circuit of said isolating and amplifying means, said potentiometer having mechanical member operable to move said variable terminal.

8. Apparatus for producing a voltage commensurate with the adjustment of a variable impedance device having two end terminals, a winding between said terminals, and a tap relatively movable along said winding, the combination of a source of voltage connected to said end terminals, a load impedance connected to said tap and to one of said end terminals, isolating and amplifying means having input and output circuits, said input circuit being connected in parallel circuit relationship with said load impedance, a second impedance connected to said load impedance and to said output circuit, said second impedance and said load impedance being connected in series across said output circuit.

9. Apparatus for supplying a voltage to a load impedance comprising a voltage source, a load impedance directly connected across the terminals of said voltage source, isolating means comprising a cathode follower stage connected to said voltage source, voltage amplifying means having further impedance means connected to receive the output of said cathode follower stage, said further impedance means having an impedance substantially equal to the voltage gain of said cathode follower and said amplifying means multiplied by the impedance of said load impedance, less the impedance of said load impedance.

10. An electrical distribution system comprising a source of voltage and a load impedance connected in parallel circuit relationship, amplifying and isolating means having input and output circuits, means connecting the voltage of said source to the input of said amplifying means, and further impedance means connected between the output circuit of said amplifying means and said source characterized by circuit parameters producing substantially equal currents through said further impedance means and said load impedance.

References Cited in the file of this patent

UNITED STATES PATENTS 2,322,498 Zeitlin ---------------- June 22, 1943